(12) United States Patent
Chen et al.

(10) Patent No.: US 7,647,072 B2
(45) Date of Patent: Jan. 12, 2010

(54) IP SWITCHING BASED DISTRIBUTED RADIO NETWORK CONTROLLER

(75) Inventors: Xiyuan Chen, Shenzhen (CN); Baijun Zhao, Shenzhen (CN); Ping Lin, Shenzhen (CN)

(73) Assignee: Utstarcom (China) Co., Ltd., Beijing (CN)

( * ) Notice: Subject to any disclaimer, the term of this patent is extended or adjusted under 35 U.S.C. 154(b) by 205 days.

(21) Appl. No.: 10/564,995

(22) PCT Filed: Jul. 16, 2003

(86) PCT No.: PCT/CN03/00568

§ 371 (c)(1),
(2), (4) Date: Apr. 12, 2007

(87) PCT Pub. No.: WO2005/009060

PCT Pub. Date: Jan. 27, 2005

(65) Prior Publication Data

US 2007/0263636 A1 Nov. 15, 2007

(51) Int. Cl.
*H04L 12/56* (2006.01)
(52) U.S. Cl. .............. 455/560; 370/395.51; 370/395.52
(58) Field of Classification Search ............ 370/395.52, 370/395.51
See application file for complete search history.

(56) References Cited

U.S. PATENT DOCUMENTS

| | | | | |
|---|---|---|---|---|
| 6,046,999 | A * | 4/2000 | Miki et al. | 370/395.52 |
| 7,043,247 | B2 * | 5/2006 | Chitrapu | 455/445 |
| 7,139,275 | B1 * | 11/2006 | Vyas | 370/395.52 |
| 7,302,497 | B2 * | 11/2007 | Vilander et al. | 709/249 |
| 7,382,783 | B2 * | 6/2008 | Kawakami et al. | 370/395.52 |
| 2003/0086374 | A1 | 5/2003 | Hayashi et al. | |
| 2004/0109455 | A1 * | 6/2004 | Jouppi et al. | 370/395.52 |
| 2004/0203640 | A1 * | 10/2004 | Molander et al. | 455/414.1 |

FOREIGN PATENT DOCUMENTS

| | | |
|---|---|---|
| EP | 126708 A1 | 1/2003 |
| EP | 1309106 A1 | 5/2003 |
| WO | WO-99/33315 | 7/1999 |

OTHER PUBLICATIONS

U.S. Appl. No. 09/035,821.
U.S. Appl. No. 09/035,788.
U.S. Appl. No. 09/188,102.
U.S. Appl. No. 09/188,347.
International Search Report for International Application PCT/CN03/00568, Dated, May 13, 2004.

* cited by examiner

*Primary Examiner*—Lester Kincaid
*Assistant Examiner*—Isaak R Jama
(74) *Attorney, Agent, or Firm*—Darby & Darby P.C.

(57) ABSTRACT

The invention provides an IP switching based radio network controller. The radio network controller comprises a plurality of functional modules, at least comprising: an ATM interface module, an interface management module, a radio signaling management module and a radio bearer processing module, characterized in that, the radio network controller replaces an ATM switch with an IP switching network to achieve data and signaling exchange among the above functional modules in the radio network controller. Said functional modules respectively comprise at least one functional board, and the functions of each of the functional modules are respectively achieved in different functional boards. The radio network controller of the invention has the advantages of low cost, simple configuration and management, and easy to achieve the system.

13 Claims, 10 Drawing Sheets

IP SWITCHING BASED DISTRIBUTED RADIO NETWORK CONTROLLER

CROSS REFERENCE TO PRIOR APPLICATION

This is a National Phase application under 35 U.S.C. §371 of International Patent Application No. PCT/CN03/00568, filed Jul. 16, 2003. The International Application was published on Jan. 27, 2005 as WO 2005/009060 A1 PCT Article 21(2).

FIELD OF THE INVENTION

The present invention generally relates to a code division multiple access (CDMA) communication system, and more particularly, to a radio network controller for use in the third generation mobile communication wideband code division multiple access (3G W-CDMA) system.

BACKGROUND OF THE INVENTION

The radio network controller (RNC) is an important component in the third generation mobile communication wideband code division multiple access system (3G W-CDMA), which performs important functions such as access control of a radio network, management of radio resources, establishment and release of radio links, and the performance of which will directly decide quality of service that can be provided by the whole 3G W-CDMA system. Since a huge 3G network can only be built step by step, in order to ensure low cost and high efficiency of an initial investment of an operator and smooth extension of the 3G network, the RNC must have good extendibility.

However, in the current 3GPP Release 1999 protocol specification regarding W-CDMA, the RNC and other network elements in the 3G systems transmit information through ATM. Therefore, many equipment providers naturally adopt ATM switching mode. However, the ATM switch has many defects such as high cost, complex configuration and management, and hard to extend.

FIG. 1 describes features of the structure of an ATM switching based radio network controller. It can be seen from FIG. 1 that, the ATM switching based radio network controller comprises a multiplexing and interface module (MUX), an ATM switching model (Switching), a signaling processing unit (SPU), a data processing unit (DPU) and a resource control unit (RCU), wherein the MUX module performs an external interface function of the controller, the Switch module performs data exchange between the above units and maintain routing of the data exchange, the SPU module performs the processing of a signaling part of the protocol, the DPU module performs the processing of a data part of the protocol, and the RCU module performs a control function of radio resources and local resources of the controller, and is connected to an external operation, maintenance and management (O&M) equipment.

A common ATM switching has the following features: the ATM switching is connection oriented, and requires configuration and management operations such as node initialization and routing table maintenance; the ATM switching network is difficult to perform a multipoint transmission and broadcast function, and the ATM switching module (ATM switch) must use the routing table to determine a next output route and port of the information; the ATM route identification is network structure oriented, is determined by a virtual path identification (VPI) and a virtual channel identification (VCI), and needs to be configured and maintained. During information transmission, a header of each information element comprises the current route identification.

Generally, an ATM switching flow is that, a switching node extracts the route identification from a received information element, looks up the routing table to obtain the next route identification and the output port, changes the route identification in the header of the information element, and transmits the information element out from the output port. By taking the 3G protocol as an example, in a radio network controller using ATM technology, the operating principle of information exchange is shown in brief as follows:

RRC message flow:

Iub→MUX→Switch→DPU→Switch→SPU
   NBAP/RANAP/RNSAP/ALCAP message flow:

Iub/Iur/Iu→MUX→Switch→SPU
   Iub→Iur data flow:

Iub→MUX→Switch→DPU→Switch→MUX→Iur
   Iub→Iu data flow:

Iub→MUX→Switch→DPU→Switch→MUX→Iu

The above information exchange flows will be respectively explained below:

1. RRC information exchange flow: after the RRC information coming from the Iub interface is received by the multiplexing and interface module (MUX), its route identification is exchanged and is transmitted to the ATM switching module (Switch); the Switching module exchanges the route identification and transmits the information to a specified data processing unit (DPU); the DPU module processes a user plane protocol and reroutes so as to re-transmit the information to the Switch module; the Switch module exchanges the route identification and finally transmits the information to the signaling processing unit (SPU).

2. RANAP information exchange flow: after the RANAP information coming from the Iu interface is received by the multiplexing and interface module (MUX), its route identification is exchanged and is transmitted to the ATM switching module (Switch); the Switch module exchanges the route identification and finally transmits the information to the signaling processing unit (SPU). NBAP, RNSAP and ALCAP information flows are the same as or similar to the RANAP information flow.

3. Iub to Iur information exchange flow: after the user data information coming from the Iub interface is received by the multiplexing and interface module (MUX), its route identification is exchanged and is transmitted to the ATM switching module (Switch); the Switch module exchanges the route identification and transmits it to a specified data processing unit (DPU); the DPU module processes the user plane protocol and reroutes so as to re-transmit the information to the Switch module; the Switch module exchanges the route identification and transmits it to the MUX module; MUX module exchanges routes and finally transmits the information to the Iur interface.

4. Iub to Iu information exchange flow, which is similar to the Iub to Iur information exchange flow, but finally transmits the information to the Iu interface.

When the above message flows or data flows are switched based on ATM, it is crucial to specify in the header of each data package, ID of PVC and its AAL2 or AAL5 as an index of the ATM switching.

It can be seen from the features of the ATM switching itself and the operating principle of ATM information exchange, the traditional radio network controller using ATM switching technology has the following defects: since an end-to-end connection needs to be established between ATM switching based processing units, the process of configuring, establishing and removing routes is complex and its switching network needs a lot of routing information to manage and maintain. In addition, it is very difficult to pack and unpack ATM information elements, such that each step of the switching flow has a certain complexity.

As to the extendibility, the ATM switching based radio network controller generally uses a single chassis, thus its extensibility is poor. Since the ATM switching mechanism is difficult to be achieved, even if a back-plate bus type is used, existing ATM switching products are generally used between multiple chassis. Since switching ports supported by these products are generally fewer, if they are cascaded by multiple layers, the switching routing configuration will be more complex and the operation and maintenance will be more difficult. For example, if the radio network controller is extended on the basis of the structure shown in FIG. 1, not only an extended switching interface block (SXB) is required to be added in each chassis, but also an external ATM switch is required to connect an elementary unit (chassis) with an extended unit (chassis). Since connecting end points have different features, the multiplexing and interface (an external interface of the RNC that is mainly user-network interface UNI) module cannot be identical with the extended switching interface (the internal extended interface of the RNC that is mainly network-network interface NNI), which further adds the complexity and processing difficulty of the switching routing in the ATM switching module within the chassis. When the number of the extended chassis increases, the complexity of the switching module in the chassis increases, thus routing configuration and management becomes a bottleneck of the extensibility and maintainability of the overall product. In addition, the use of external ATM switch or cascaded ATM switch having a large capacity also has the problem of complex configuration, which is also a factor to limit its extensibility.

Since the various processing modules (for example, SPU, MUX, SXB, and so on) cannot be implemented in a unified platform, the cost for implementing the processing modules is comparatively higher. Heretofore, the cost for implementing the ATM switching module or ATM switch is also comparatively higher and there is little choice in the market, thus the overall cost of the ATM switching based radio network controller is comparatively higher.

In summary, the radio network controller using the ATM switch is high in cost, complex in configuration and management and difficult to extend, all of which will affect the build of the future 3G network.

SUMMARY OF THE INVENTION

In order to overcome the defects of complex configuration and management, poor extensibility and high cost in the ATM switching based radio network controller, the present invention replaces the ATM switch with the IP switching network supporting QoS to achieve data and signaling exchange within RNC, and at the same time achieves the isolation of the functional modules such as signaling processing module, interface management module, radio bearer processing module and ATM interface module.

To this end, the invention provides an IP switching based distributed radio network controller system, comprising a plurality of functional modules comprising: an ATM interface module comprising a plurality of ATM interface boards, an interface management module comprising one or more interface management boards, a radio signaling processing module comprising one or more radio signaling processing boards and a radio bearer processing module comprising one or more radio bearer processing boards. The radio network controller also comprises an IP switching module, and the above functional modules are connected to the IP switching module so as to achieve the data and signaling exchange function within the RNC, and can distribute its functions over different functional boards.

In the radio network controller system of the invention, the IP switching network supports QoS. The interface ATM board can achieve IP/ATM converting function, for providing a standard ATM interface between the radio network controller and an external network element. The number of the interface ATM boards is configured according to the data flow of the interface and the number of the ports required to be provided, and the number of the radio bearer processing boards is configured according to the number of the users and the data flow. The number of the interface management boards and the radio signaling processing boards is relatively fewer. All the functional boards of the invention are arranged in one chassis. However, with increase of the capacity, the chassis may be developed from a single chassis to a number of chassis. The modules in the same one chassis are connected to the IP switching module (SEM) via a 100M Ethernet port. In the case of a number of chassis, SEMs in different chassis are connected via a concentrator route switch.

The radio network controller of the invention has the following advantages:

1. Replacing ATM with the IP switching network supporting QoS to achieve data interaction, can not only reduce cost and simplify configuration and management, but also easily achieve smooth extension of the system. With the increase of the capacity, RNC may be developed from one chassis to a number of chassis that are uniformly addressed according to IP addresses. As a result, in addition to the addition of chassis and functional boards, complex hardware upgrade is not required.

In addition, when the 3G W-CDMA system is transmitted to an all-IP network of Release 5, the radio network control of the invention only needs removing the ATM interface boards, while making corresponding software upgrade for other functional boards. Therefore, the system can conveniently achieve smooth transition without complex system structure regulation, thus existing investment of the operator can be protected farthest.

2. Since the radio network controller uses a distributed architecture and the chassis and boards have relatively independent functions among which there is fewer limiting factors, the radio network controller has flexible configuration. Since the interface management boards and the radio signaling processing boards avoid the participation of huge user data processing, the number of them is relatively fewer. The interface boards can be configured according to data flow of the interfaces and the number of ports required to provide. The radio bearer processing boards can be configured according to the number of the users to be supported and data amount, and can be extended to a number of chassis as needed, without requiring the interface management boards or the radio signaling processing boards be extended to a number of chassis either, thereby efficiently utilizing the hardware resources and saving the cost farthest while ensuring the smooth extension of the system.

3. The IP switching based RNC can fully utilize the advantages of the IP technology being a hot-spot technology in the current stage. Since the IP technology develops very rapidly, and has a powerful industry union, the IP switching based RNC can fully utilize the development of the IP technology to achieve performance optimization and seamless upgrade.

The openness and achievability of the IP switching technology enables the RNC to have the advantages of low development cost, rapid development speed and low development risk. Compared with the ATM technology, IP technology also has an advantage that it can run in a higher layer of almost any data link technology. The developing trend of 3GPP from R99 to R5 just utilizes this trend, and the radio network controller of the invention also complies with the developing trend of 3GPP from R99 to R5.

The invention will be described below in detail in conjunction with the accompanying drawings and specific embodiments.

BRIEF DESCRIPTION OF THE DRAWINGS

FIGS. 2A-2C are schematic diagrams showing structures of a group of IP switching based radio network controllers according to the invention, wherein FIG. 2A shows the structure of a simple IP switching based RNC, FIG. 2B shows the structure of an optimized IP switching based RNC, and FIG. 2C shows the structure of an extendable IP switching based RNC;

Acronyms:
1. ATM—Asynchronous Transfer Mode
2. RRC—Radio Resource Control
3. RANAP—Radio Access Network Application Part
4. NBAP—Node B Application Part
5. RNSAP—Radio Network Subsystem Application Part
6. ALCAP—Access Link Control Application Part
7. PVC—Permanent Virtual Circuit
8. AAL2—ATM Adaption Layer Protocol Type 2
9. AAL5—ATM Adaption Layer Protocol Type 5
10. QoS—Quality of Service
11. IP—Internet Protocol
12. NAS—Network Attached Storage
13. UE—User Equipment
14. CN—Core Network
15. UTRAN—UMTS (Universal Mobile Telecommunications System) Terrestrial Radio Access Network
16. DiffServ—Differential Services
17. VLAN—Virtual Local Area Network
18. CPCI—Compact PCI (Peripheral Component Interconnect)
19. QAM—Operations, Administration, and Maintenance
20. RRM—Radio Resource Management
21. MACC—Media Access Control Communication
22. RLC—Radio Link Control
23. PDCP—Packet Data Convergence Protocol
24. GTPU—GPRS (General Packet Radio Service) Tunneling Protocol
25. MTP3B—Message Transfer Part Level 3 Broadband
26. SSCF
27. SSCOP—Service Specific Connection Oriented Protocol
28. SSCOPHE

DETAILED DESCRIPTION OF THE PREFERRED EMBODIMENT

Figure 1:
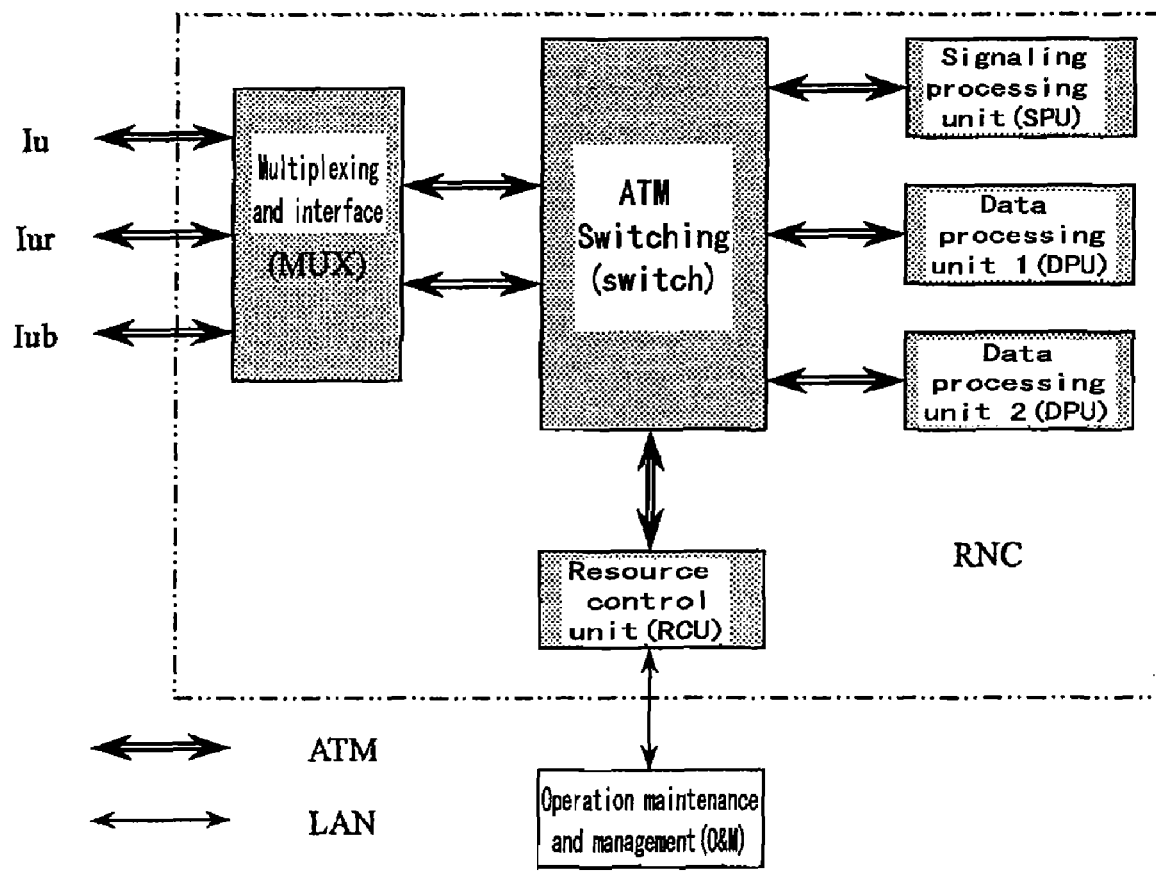
FIG. 1 is a schematic diagram showing a structure of an ATM switching based radio network controller in the prior art.
Figure 2A:
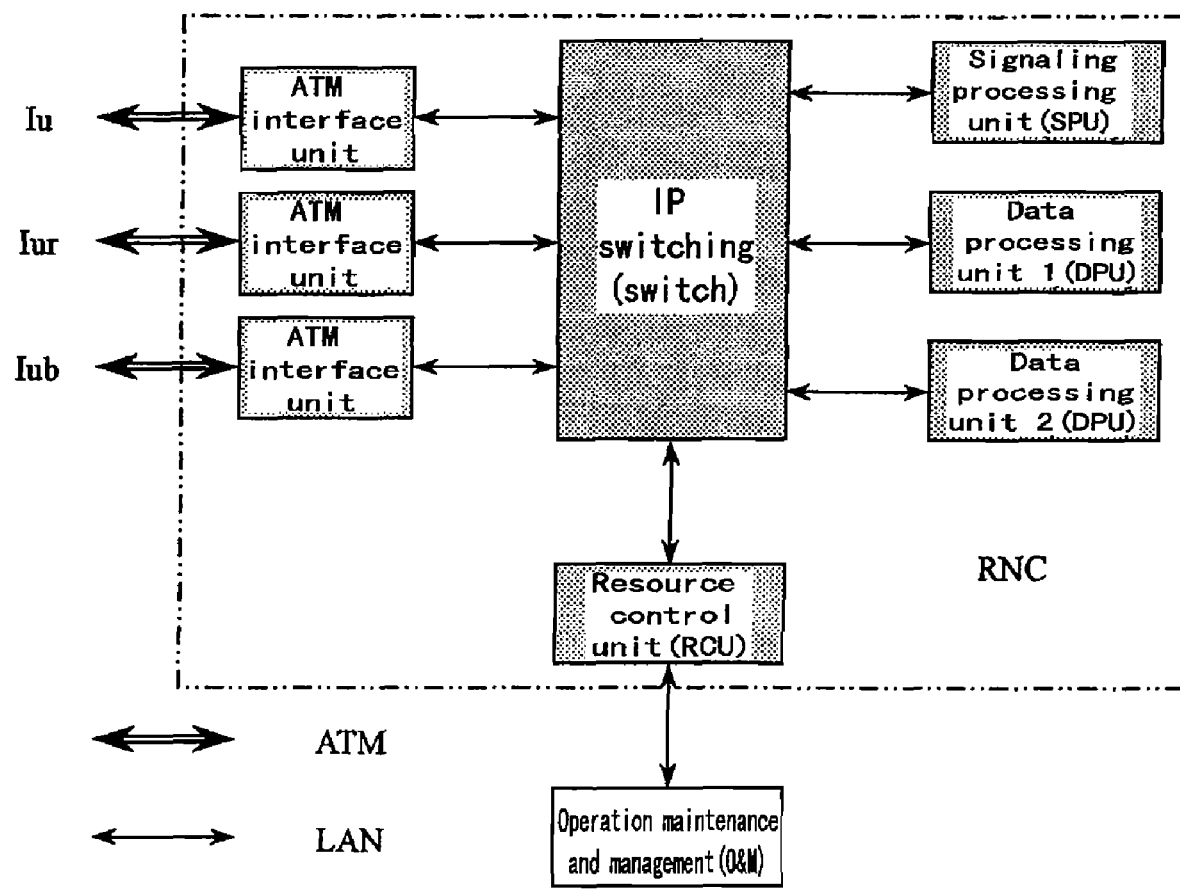

FIG. 2A shows the structural features of a simple IP switching based radio network controller that is almost the same as the ATM switching based radio network controller in FIG. 1, but replaces the ATM switching network with the IP switching network. It can be seen from FIG. 2A that, besides that the ATM interface unit uses the ATM switching mode to achieve the external interface function of the controller, the data signaling exchange function among the units inside the RNC is achieved by connecting the units with the IP switching module by means of LAN. The structure shown in FIG. 2A shows that, the use of IP switching mechanism can achieve all the capabilities of ATM switching.

Figure 2B:
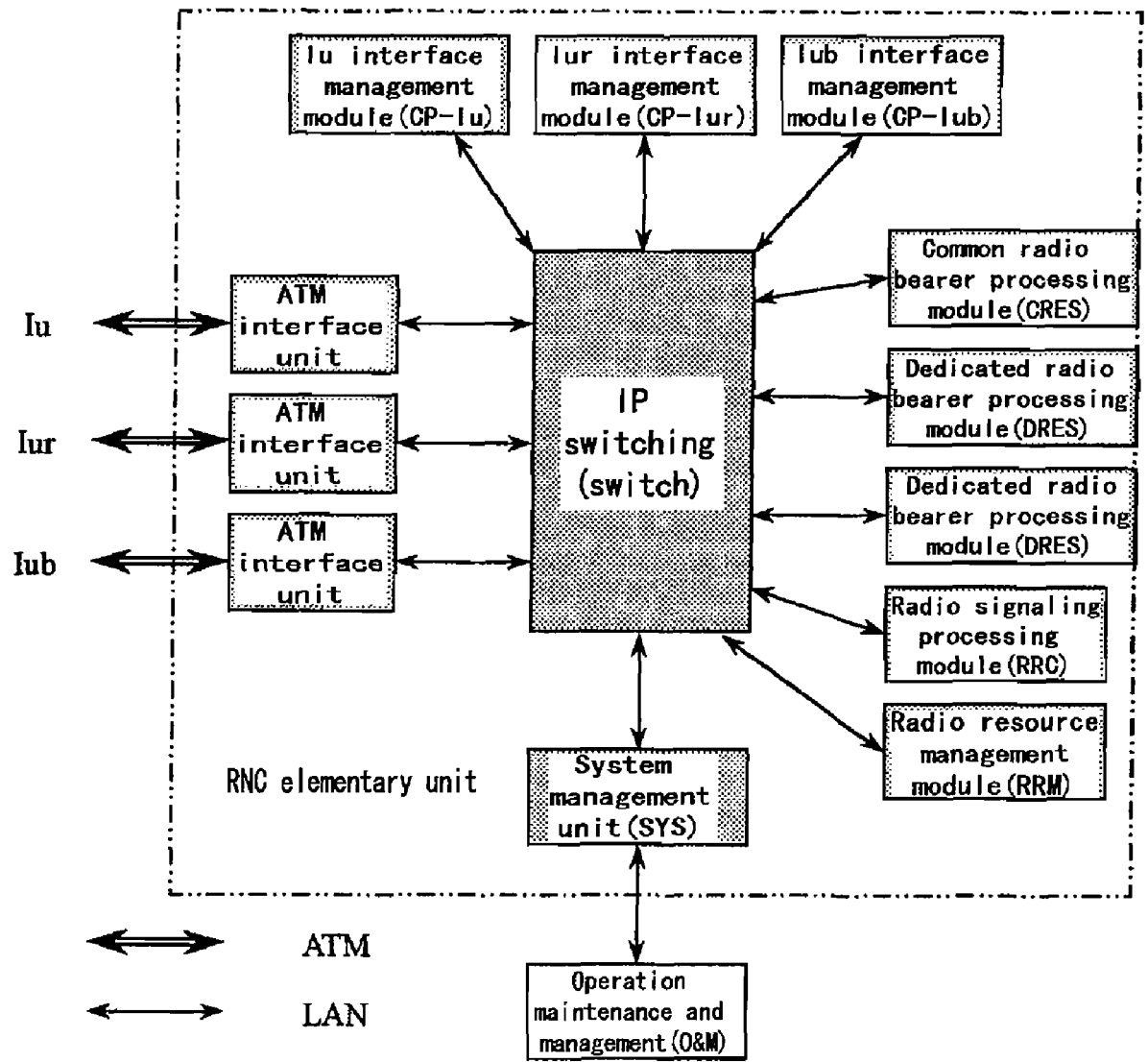

FIG. 2B shows the structure features of an optimized IP switching based radio network controller. The optimized IP switching based radio network controller is a further optimized RNC elementary unit that is based on the structure of FIG. 2A The controller comprises the following 11 functional modules: 3 ATM interface units, 1 Iu interface management module (CP-Iu), 1 Iur interface management module (CP-Iur), 1 Iub interface management module (CP-Iub), 1 common radio bearer processing module (CRES), 2 dedicated radio bearer processing module (DERS), 1 radio signaling processing module (RRC) and 1 radio resource management module (RRM). A system management unit is further comprised in the elementary unit. All of the above modules are connected with the IP switching module.

It can be seen from FIG. 2B that, the smallest RNC is configured as a RNC elementary unit, and a most simplified product only requires 4 functional modules, i.e. the ATM interface module, the interface management module, the radio signaling processing module and the radio bearer processing module. Compared with FIG. 2A, the radio signaling processing module and the radio resource management module are combined, the common radio bearer processing module and the dedicated radio bearer processing module are combined, 3 interface management modules and 3 ATM interface units are also combined. From the most simplified 4 functional modules to the 11 function modules in FIG. 2B and vice versa, the only operation is to modify IP address tables for each module, while the application software of the modules and the IP switching module and so on need no modification. The optimized functional module processes tasks more easily. In the case of the same CPU, the processing capability of the functional modules becomes more powerful, which provides a good basis for distributed processing.

The structure and operating principle of the RNC elementary units shown in FIG. 2B will be described below in detail, by combining the logic structure of the distributed radio network controller achieved according to the invention, shown in FIG. 3, with the structure of the single chassis radio network controller achieved according to the invention, shown in FIG. 4.

Figure 3:
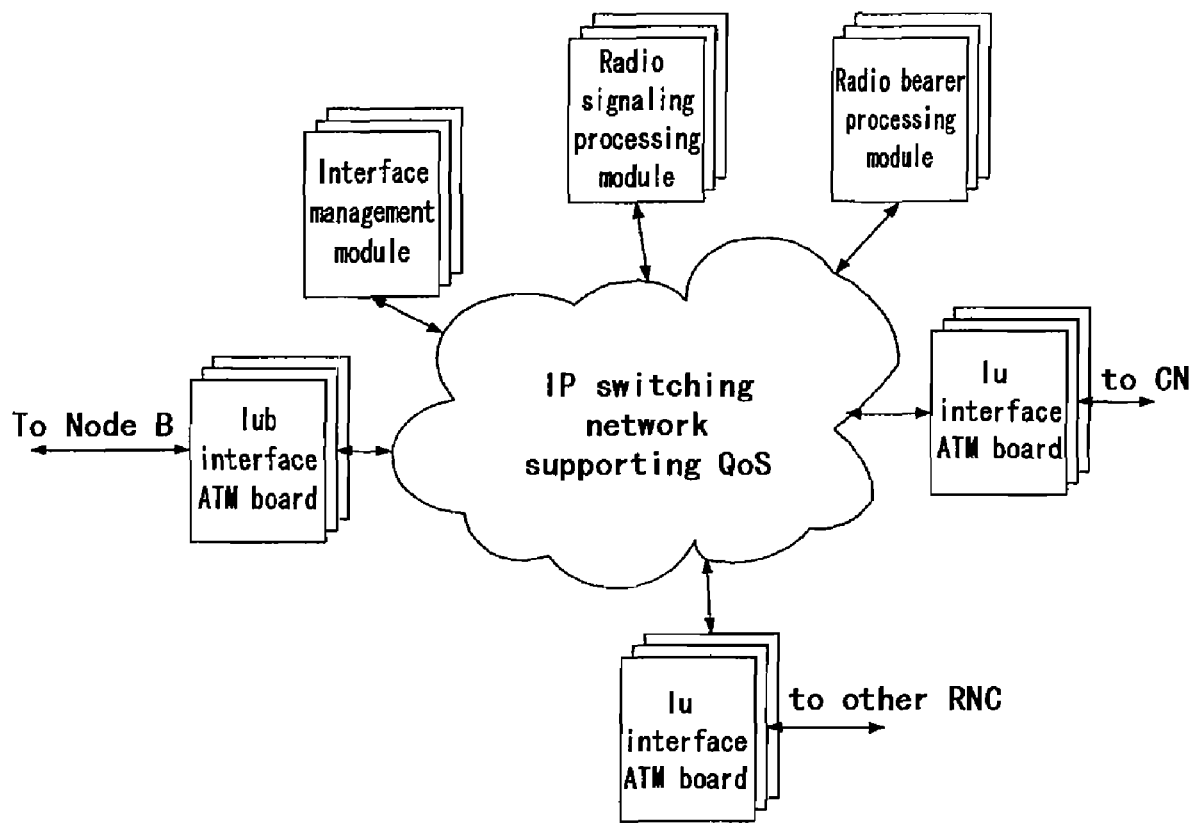
FIG. 3 is a schematic diagram showing a logic structure of a distributed radio network controller achieved according to the invention.

The radio network controller shown in FIG. 2B is achieved according to the logic structure in FIG. 3. FIG. 2B shows that, the distributed radio network controller has the following four types of functional modules: radio bearer processing module, radio signaling processing module, interface management module and ATM interface module, all of the above modules are connected with the IP switching module. The above modules have the following functions:

For physical interfaces, there are mainly three kinds of interfaces for the ATM interface module between the RNC and external network elements: an Iu interface for providing a connection between RNC and CN; an Iub interface for providing a connection between RNC and NodeB; and an Iur interface for providing a connection between RNC and RNC. The distributed radio network controller used in the invention adopts standard ATM interfaces as stipulated in 3GPP Release 1999 specification, these interfaces being provided by interface ATM boards. Each interface ATM board may provide one or more optical fibers to connect corresponding other equipments. Each interface ATM board can realize the IP/ATM converting function, and is connected to the IP switching module via a 100M Ethernet network port to realize data interaction with other functional boards of RNC. The number of interface ATM boards may be arbitrarily increased or decreased as needed.

The interface management module is divided into an Iu interface management module, an Iub interface management module and an Iur interface management module. The functions of the Iu interface management module comprise: RAB management, Iu interface link management, NAS information transmission between UE and CN, etc. The functions of the Iub interface management module mainly comprise: cell configuration management, Iub interface link management, NodeB operation and maintenance, etc. The Iur interface management module mainly manages Iur interface links to provide communication channels between SRNS and DRNS.

The functions of the radio signaling management module mainly comprise: system message broadcasting management, radio link management between UE and UTRAN, mobility management, radio resources management, outer loop power control, etc.

The radio signaling processing module mainly performs data processing and transmission function over the common/dedicated transmission channel.

Each of the above functional modules may be realized in one board or realized collectively by a plurality of boards. The functional boards of the RNC may be arranged in a single RNC chassis, the structure of which is shown as the embodiment in FIG. 4. The single chassis RNC comprises a radio signaling processing board constituting the radio signaling processing module; two radio bearer processing boards constituting the radio bearer processing module; one Iub interface ATM board and one Iub interface management board; one Iur interface ATM board and one Iur interface management board; one Iu interface ATM board and one Iu interface management board, wherein one or more Iub/Iur/Iu interface ATM boards constitute so called ATM interface module, and one or more Iub/Iur/Iu interface management boards constitute the Iub/Iur/Iu interface management board; the above functional modules are connected with the IP switching module that comprises two IP switching boards.

Figure 4:
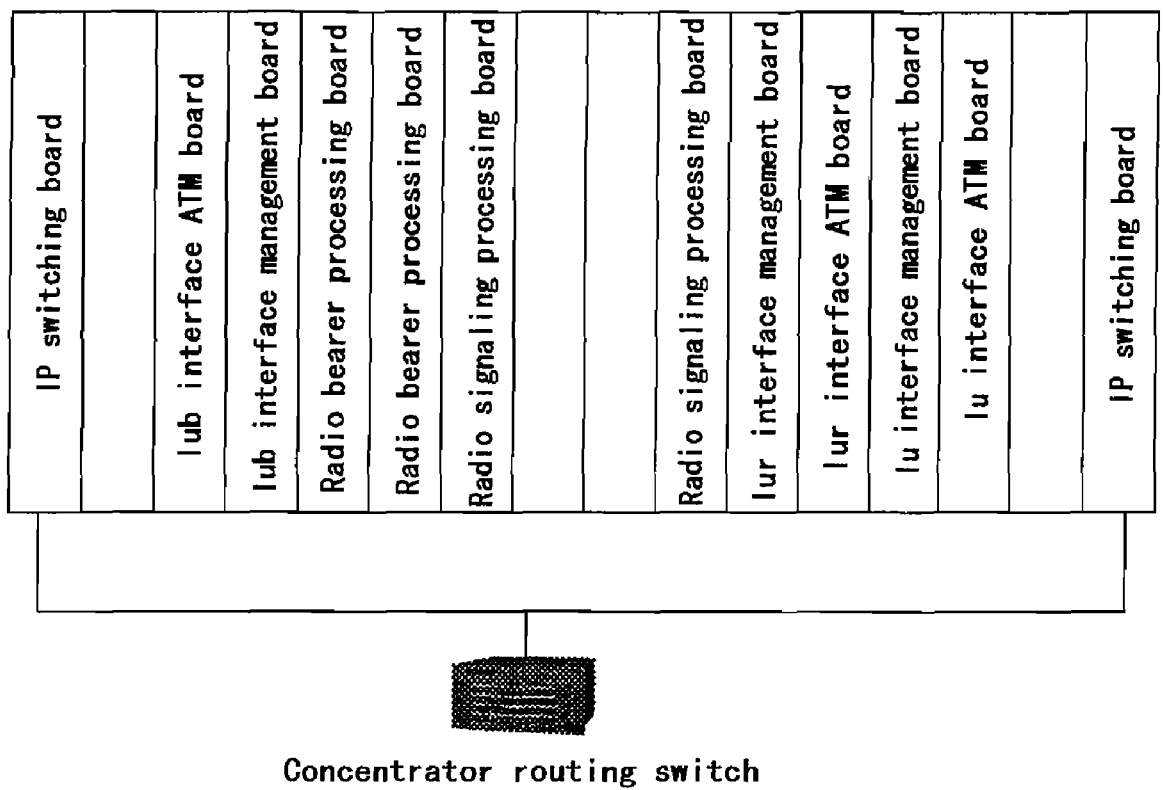
FIG. 4 is a schematic diagram showing a structure of a single-chassis radio network controller achieved according to the invention.

Each of the above boards in FIG. 4 is connected to the IP switching module via a 100M fast Ethernet network port to achieve data interaction among boards. The number of each board can be determined by the processing capability of the board, system capacity and the feature of the achieved function to achieve proportional configuration. Specifically, since the interface management board and the radio signaling processing board avoid the participation of huge user data processing, the number of them may be relatively fewer; the interface ATM board may be configured according to data flow of the interfaces and the number of the ports required to provide. The radio bearer processing board may be configured according to the number of users to be supported and data flow, and may be extended to a number of chassis as needed, without requiring the interface management board or the radio signaling processing board be extended to a number of chassis. By taking the radio bearer processing module as an example, if it is supposed that the ratio of the processing capability of the common radio bearer processing module to the dedicated radio bearer processing module is 1:10, then in various phases of the system, no matter how much the load is, the system can optimally configured according to the ratio, so as to achieve a very flexible configuration and utilize hardware resources farthest.

In the embodiment of FIG. 4, in order to optimize the processing capability, the RNC also achieves a processing mechanism that separates data from signaling and that has a prominent advantage when the system extends the users or interfaces. Specifically, this mechanism is that, when a dedicated connection is not required, the functions such as signaling continuation, resource distribution and link management are performed by the radio signaling processing module and the interface management module cooperatively. When the dedicated connection is required, the radio signaling processing module specifies a dedicated radio bearer processing board to be responsible for user data transmission, and establishes a routing mapping between a corresponding ATM interface board and the dedicated radio bearer processing board. Thereafter, the user data packages are directly transmitted to the dedicated radio bearer processing board by the ATM interface board for processing, and the radio signaling management board and the interface management board are not required to participate in the processing of the data package any more.

Figure 5A:
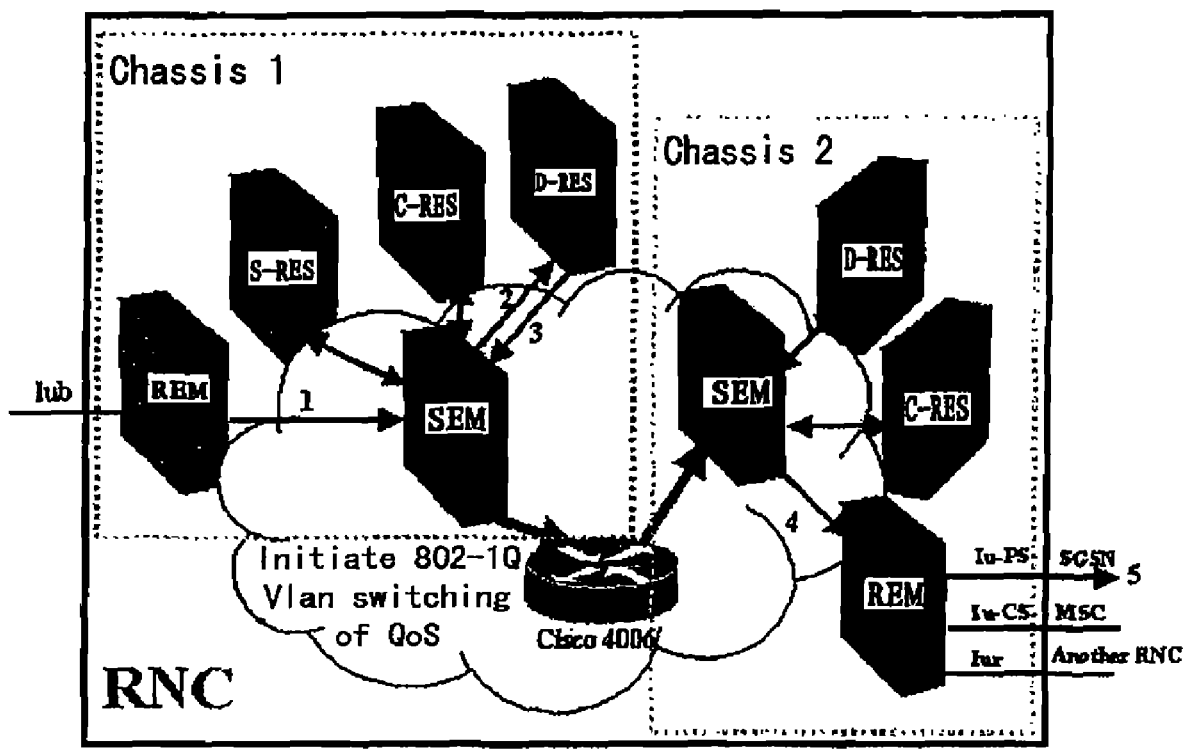
FIG. 5A shows connection and data transmission relations among the modules in a double-chassis RNC according to the invention.

In order to ensure non-blocking switching of data among the modules, the radio network controller replaces the ATM switch with an IP switching network supporting QoS to achieve communications among the modules. The components of the IP switching network supporting QoS and the connecting relation between them and the modules are shown in FIG. 5A. The IP switching network comprises a group of IP switching modules and a line-speed concentrator routing switch, all of the above switching devices support IP DiffServ (differentiate service) to provide IP QoS, and can recognize and meet different service quality requirements. All the above RNC functional modules in the same one chassis can achieve a point-to-point rapid network connection via the IP switching module. In the case of a number of chassis, the concentrator routing switch will provide a Gbits Ethernet interface to connect the IP switching modules in the chassis to form an IP switching network.

When a certain functional board of the radio network controller intends to perform data interaction with other functional boards, the functional board packs the data to be transmitted into an IP package to transmit to the IP switching module. During transmission, the processing module controls or distributes DSCP-DiffServ codepoint in the DiffServ field of the IP package according to different service flows, and the IP switching module queues and schedules the IP package according to the DiffServ field of all the IP packages destined to the same destination address, and forwards the IP package to a destination board. If the destination board is in another chassis, the IP package needs to be further forwarded by the concentrator routing switch.

The functional modules of RNC can control or distribute DiffServ values of different service flows such as voice, short message, data or video, and fill in the DiffServ field of the IP header sent out. The IP switching module or concentrator routing switch generally does not participate in complete service classification. It reads the IP header and differentiates the services according to additional classification information in the DiffServ field. The above two routing switching equipments can achieve the queuing and scheduling functions. Converged services can be scheduled or distributed to different queues by using the DiffServ values, and different queues will occupy different bandwidths, thus achieving QoS required by different services.

How to achieve QoS in RNC will be described below with reference to FIGS. 5A and 5B, by taking the data transmission to the PS field via RNC as an example.

FIG. 5A shows a double-chassis RNC. In both chassis 1 and chassis 2, the modules are connected to the IP switching module (SEM) via a 100M Ethernet network port; SEMs in different chassis are connected via the concentrator routing switch between chassis 1 and chassis 2. The modules in RNC support 802.1Q VLAN, services of class 1 to 4 and priority queuing. The concentrator routing switch also supports 802.1Q VLAN, service of class 8, a plurality of priority queuing methods and a plurality of congestion avoidance tools.

Figure 5B:
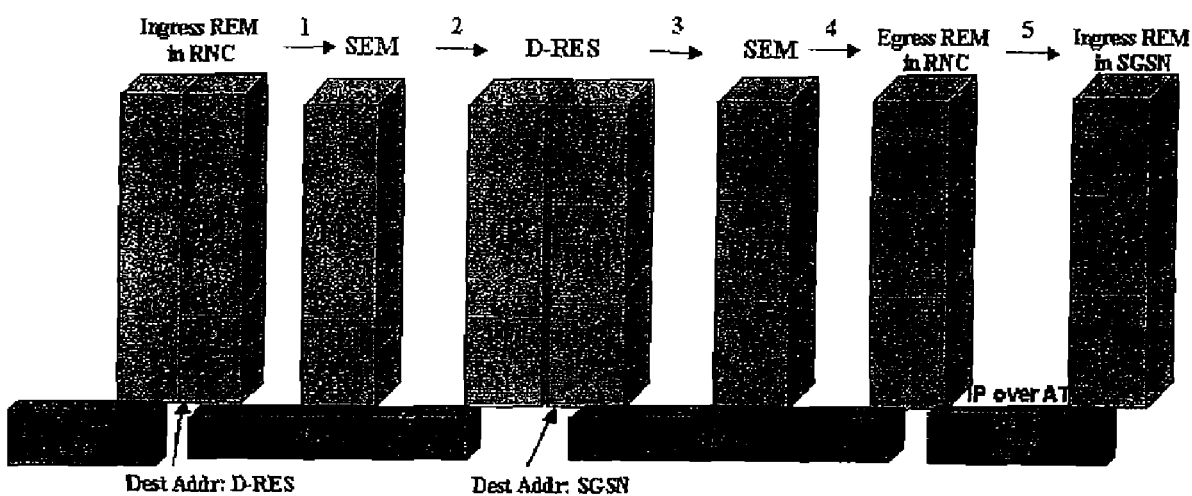
FIG. 5B shows a process for achieving QoS in the data transmission from the RNC in FIG. 5A to a PS field.

In FIGS. 5A and 5B, the following numerals 1-5 respectively represent data transmission routes between different modules:

Numeral 1: REM→SEM
Numeral 2: SEM→D-RES
Numeral 3: D-RES→SEM
Numeral 4: SEM→REM
Numeral 5: REM→SGSN FIG. 5B shows how to achieve the QoS in the above 5 routes. Specifically, for (1) the QoS between the Iub interface ATM board (REM) and the dedicated radio bearer processing module (D-RES), i.e. the QoS of the routes corresponding to the Numeral 1 and Numeral 2 in FIG. 5B: the ATM can distribute different VCs to respectively transmit voice and data in advance according to the user information. Thus, for user packages coming from the Iub interface, REM board may make a VC based classification to determine its DSCP value. When delivering the user package to the D-RES board via the SEM board via 802.1Q VLAN, both the REM and SEM boards can provide QoS in layer 2. The priority value of the VLAN header can be obtained from directly scaling the DSCP value. For (2) the QoS between the dedicated radio bearer processing module (D-RES) and the Iu-PS interface ATM board (REM), i.e. the QoS of the routes corresponding to the Numeral 3 and Numeral 4 in FIG. 5B: D-RES board performs the processing of the user package. The isolated voice package and data package are respectively forwarded to MSC and SGSN via the Iu-PS interface ATM board (REM), and their DSCP values can be obtained from scaling the bearer service attribute of UMTS. Also, 802.1Q VLAN is used to provide the QoS between D-RES→SEM→REM. If the concentrator routing switch is used to connect SEMs in different chassis, the QoS is also achieved by 802.1Q VLAN.

Based on the above IP switching network and the distributed structure that divides modules according to functions, the operating principle of information exchange in the IP switching based RNC elementary unit shown in FIG. 2B is as follows:

RRC message flow:

Iub→ATM→Switch→C/DRES→Switch→RRC
NBAP/RANAP/RNSAP/ALCAP message flow:

Iub/Iur/Iu→ATM→Switch→CP-Iub/CP-Iur/CP-Iu
Iub→Iur data flow:

Iub→ATM→Switch→DRES→Switch→ATM→Iur
Iub→Iu data flow:

Iub→ATM→Switch→DRES→Switch→ATM→Iu

When the above message flows or data flows are switched based on IP, it is crucial to specify in the header of each data package an IP address and a port number as an UDP/IP index.

Since the communication between modules is connectionless, the route maintenance is simple and route cascade and extension can be easily achieved.

Figure 2C:
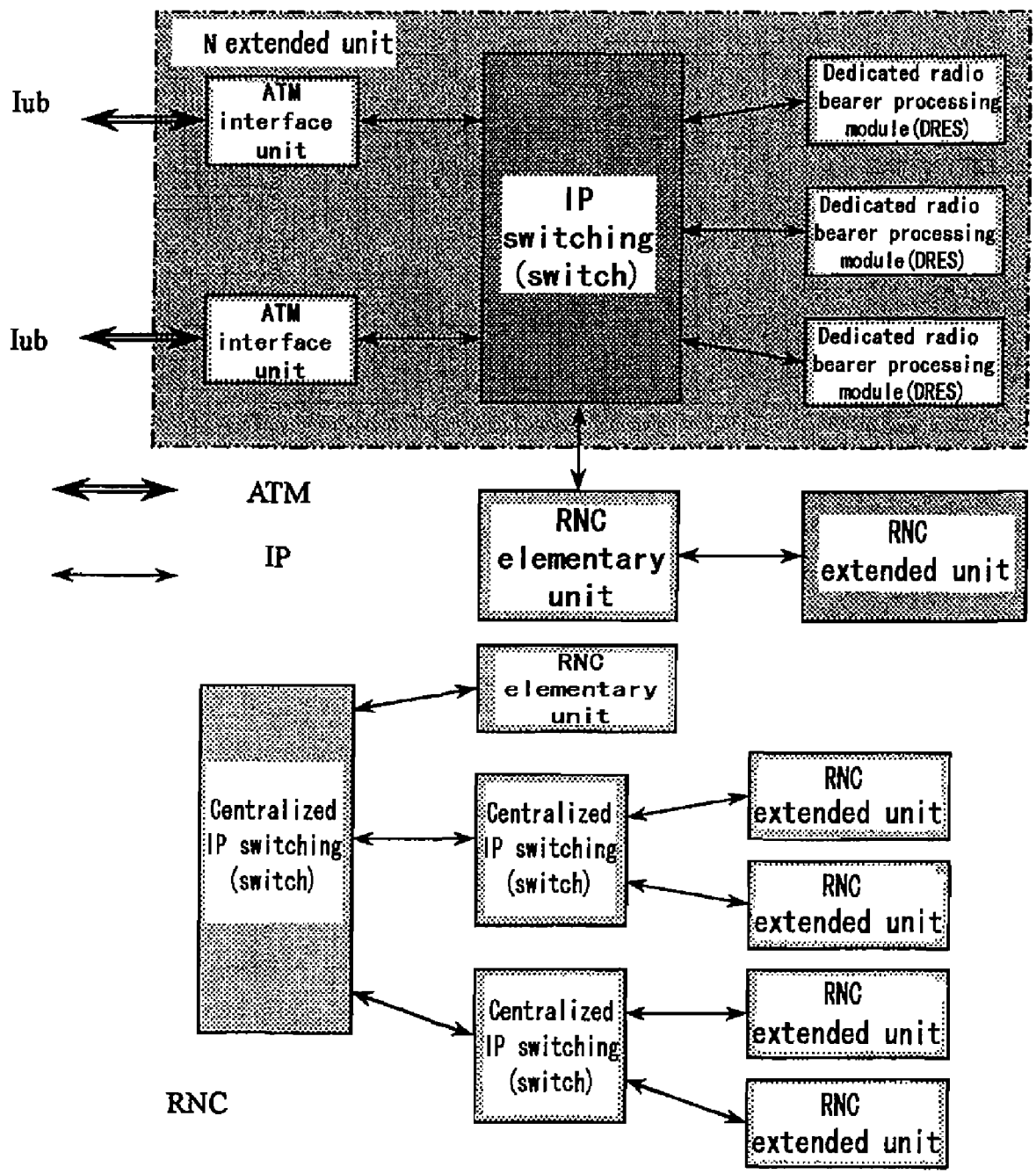

FIG. 2C describes the structural features of the IP switching based distributed radio network controller, for explaining the extensibility of the IP based distributed switching RNC. The above radio network controller is developed from the structure of FIG. 2B. In FIG. 2c, the RNC elementary unit is a chassis comprising 4 most elementary functional modules; each RNC extended unit occupies a chassis, wherein each extended chassis comprises a dedicated radio bearer processing module and an ATM interface module for Iub; the concentrator routing switch is a peripheral equipment. The single chassis RNC only comprises a RNC elementary unit, while the multiple chassis RNC comprise an elementary unit and a plurality of extended units, and each RNC extended unit comprises the IP switching module. In the RNC elementary unit, the IP switching module is used to connect the functional modules; an IP network is formed by connecting the IP switching module with the concentrator routing switch, among the units of the multiple chassis RNC, thus a complete radio network controller is formed. The IP switching module in each unit provides several Gbits or tens of Gbits network interface to connect to the concentrator routing switch. The concentrator routing switch also connects an operation and maintenance center. According to the features of the IP network, from the viewpoint of the operation and maintenance center (or operation and maintenance members), the RNC constituted by the plurality of units is a simple and directly visible integer. All the modules, no matter whether they are in the elementary unit or in the extended unit, have no difference.

In the embodiment shown in FIG. 2C, in order to connect the RNC elementary unit and the RNC extended unit, the IP routing switch is used. The principle and function of the IP routing switch and the IP switching module in each chassis are completely the same. With the current IP technology, a powerful core IP routing switch can support the switching capability of hundreds of Gbits, an can ensure the QoS. Since the IP switching network does not need to establish an end-to-end connection and signaling protocol, the address identification of an IP switching node is independent from its network structure, which enables simply and flexibly increasing or decreasing its switching nodes (whether they are end points or intermediate nodes), and has no effect on any other nodes in the network. With the RNC having such property, its functional modules can be further subdivided and extended.

See the extending process from FIG. 2B to FIG. 2C again. When the capacity of the users needs to be increased, the system may achieve the capacity increase by adding the extended units and IP switch. Since the division of the functional modules of the overall RNC is meticulous and reasonable, main static and semi-static information processing can be achieve by the modules in the elementary unit, thus the components of the extended unit is extremely simple, only two functional modules: the dedicated radio bearer processing module and the ATM interface module are needed, and the centralized IP switch is simply required to connect and switch the elementary unit and the extended unit. During the overall process, the configuration and function of the elementary unit need not to be changed, the IP switch needs no additional special configuration, and the system operation and maintenance center even does not need to differentiate the extended unit and the elementary unit, but simply increases the IP address of a new functional module. Since IP switching is simple, cascaded IP switching connections as shown may be achieved when necessary. The number of the extended modules can be arbitrarily increased or decreased, and this process is smooth, simple, needs little operation and maintenance, thus the RNC having this architecture has a very good extensibility.

Figure 6:
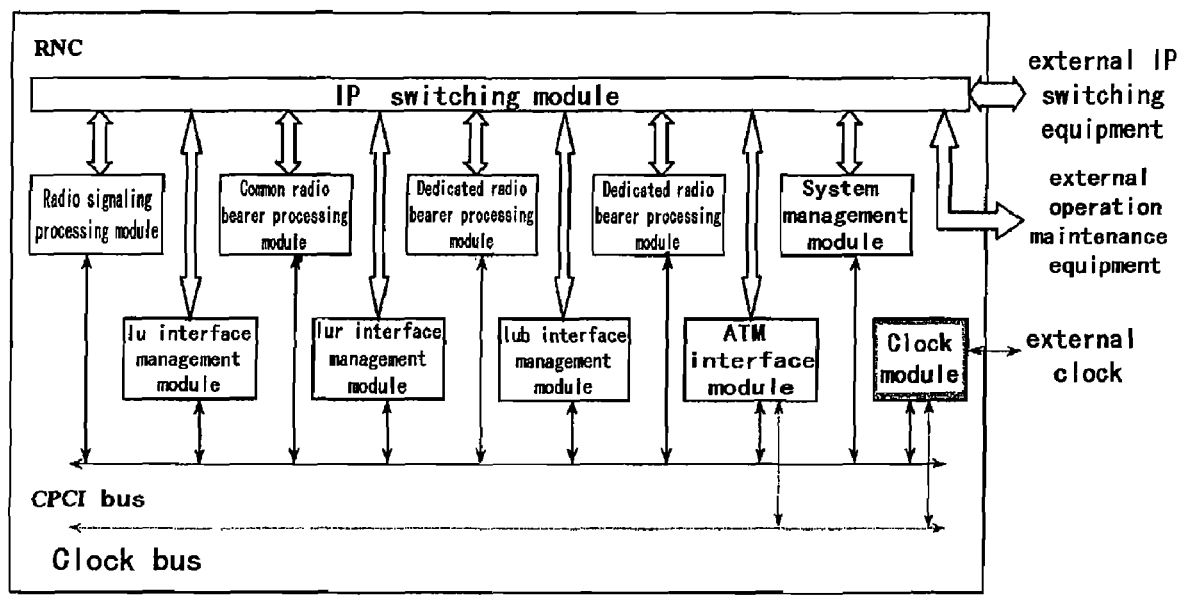
FIG. 6 is an embodiment of the IP switching based distributed radio network controller achieved according to the invention.

FIG. 6 shows an IP switching based distributed radio network controller achieved according to the invention. The radio network controller divides modules according to functions. The component and function of the modules are as follows:

IP switching module: providing non-blocking line-speed L2/L3 switching function, and providing 24 internal FE accesses and 2 external GE accesses;

CPCI bus: 2 32-bit buses that support CPCI control function;

Clock bus: providing a function of transmitting a clock signal;

System management module: controlling all hardware resources via the CPCI bus, and achieving OAM Agent and necessary management functions in the product;

Radio signaling processing module: achieving the entity and function of RRM and RRC protocols and the like;

Common radio bearer processing module: achieving the entity and function of FP, MACC and RLC protocols and the like, associated with common channels;

Dedicated radio bearer processing module: achieving the entity and function of the FP, MACD, RLC, PDCP, GTPU, and UP protocols, and the like, associated with dedicated channels;

Iu interface management module: achieving the entity and function of RANAP, SCCP, MTP3 B, SSCF, SSCOP, M3 UA, SCTP and ALCAP protocols and the like;

Iur interface management module: achieving the entity and function of RASAP, SCCP, MTP3B, SSCF, SSCOP and ALCAP protocols and the like;

Iub interface management module: achieving the entity and function of NBAP, SSCF, SSCOPHE and ALCAP protocols and the like;

ATM interface module: achieving ATM, AAL5, AAL2 and IPOA protocols and functions, and externally providing STM-1 or E1 interface;

Clock module: locking the frequency of an external clock, generating different clock signals for different modules, and providing clock signaling to Node-B via the Iub ATM interface module.

According to the description of FIG. 6, the RNC, according to the features of the 3G protocol, first divides the functional part into a control plane and a user plane to perform classification processing. The control plane is subdivided into the radio signaling processing module and the Iub, Iu and Iur interface management modules, thereby achieving the object of distributed processing. The radio signaling takes on the function of radio resource management, in addition to the module. Separating the interface management module from the signaling processing module can manage the interface resources (SCCP, MTP, ALCAP, and so on) and interface application protocols (NBAP, RANAP, RNSAP, and so on) more efficiently. The user plane is also subdivided into the dedicated radio bearer processing module, the common radio bearer processing module and the ATM interface module. Isolating the common radio bearer processing from the dedicated radio bearer processing is advantageous to a rational distribution of the processing capability. The common radio bearer is a semi-static resource, and its processing flow is easy to estimate, thus this structure facilitates the planning and configuration of the common radio bearer processing module. However, the dedicated radio bearer is an all-dynamic resource and requires real time update, its processing flow varies greatly, and the requirement to its processing capability is also high, thus, this structure facilitates its largely distributed in the extended unit of RNC. Since the dedicated radio bearer module and the ATM interface module are relatively independent, it is advantageous for them to be rationally arranged in the RNC extended unit according a certain proportion. Of course, during version upgrade of the RNC from R99 release to R5 release, seen from the structure of the RNC, only ATM interface module needs to be updated.

The RNC also comprises other secondary modules such as system management module, IP switching module and clock module. The secondary modules are combined with the functional modules to make the RNC an stand-alone product that has a good structure and fine performance, is easy to extend and easy to operate and maintain.

The IP switching based distributed radio network controller shown in FIG. 6 adopts IP switching. Since it has a simple route, and conveniently supports data exchange between multiple processing modules, it provides a foundation for optimizing the structure of the modules. Then the modules are configured proportionally according to the processing capability of the modules. Suppose the ratio of the processing capability of the common radio bearer processing module to the dedicated radio bearer processing modules is 1:10, then in various stages of the system, no matter how much the load is, the system can be optimally configured according to this ratio. However, if, in order to reduce the switched units, the above two modules are mixed in the same processing unit, then the effect of optimal configuration is hard to be reached.

In addition, since the IP switching based distributed radio network controller shown in FIG. 6 uses modular design and IP switching, it can easily achieve the extension from one chassis to multiple chassis. When the RNC is expanded directed to the user or the interface, only the dedicated bearer processing module and the ATM interface module are needed to be expanded.

The IP switching based distributed radio network controller as shown comprises an ATM interface module, wherein the ATM interface boards constituting the ATM interface module can achieve the IP/ATM conversion, and achieve the data and signaling exchange function inside the RNC via the IP switching network while providing a standard external ATM interface.

Figure 7:
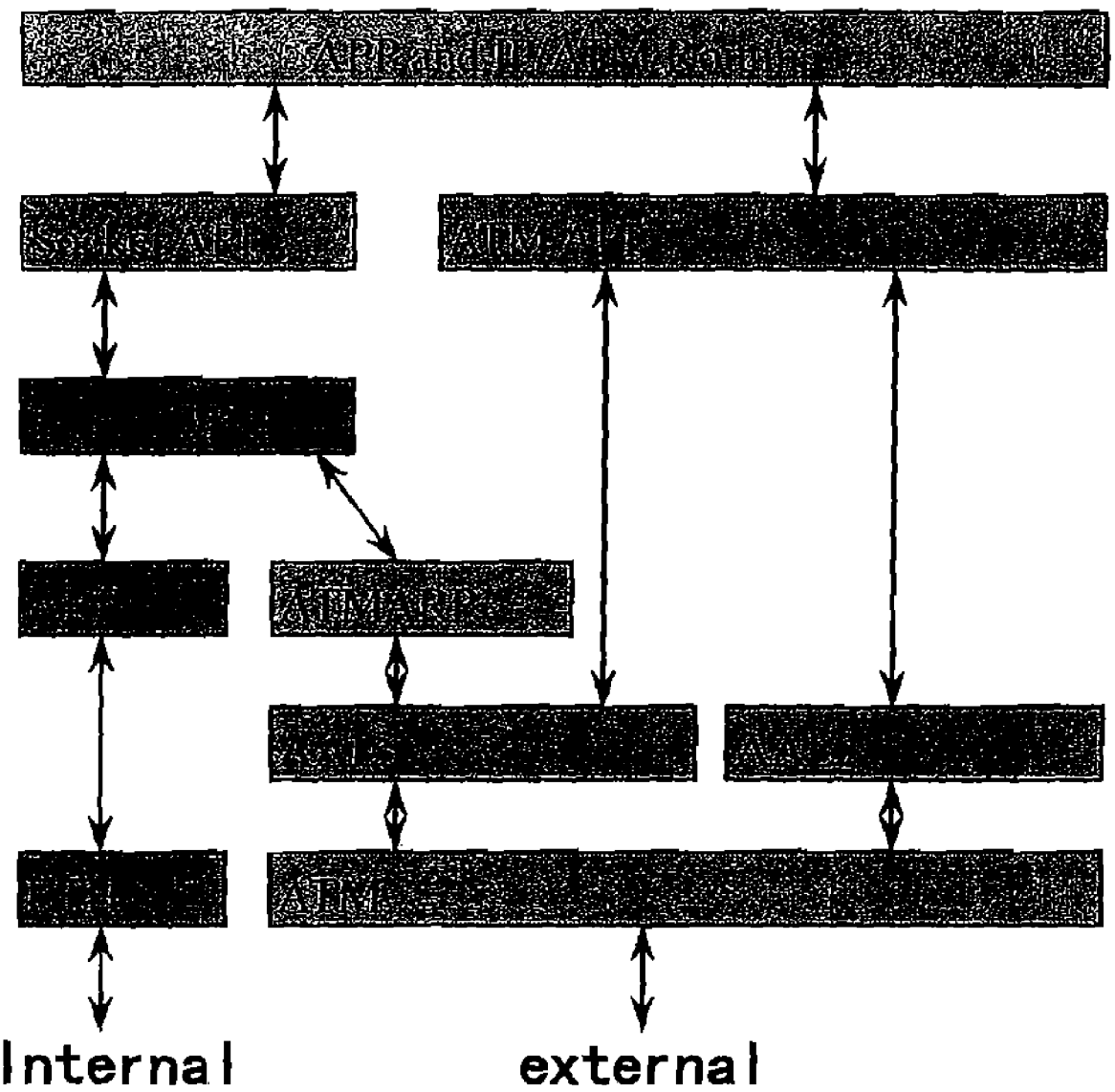
FIG. 7 is a schematic diagram showing an IP/ATM converting mechanism achieved in an ATM interface board.

FIG. 7 shows protocol entities used for achieving the IP/ATM converting mechanism in the ATM interface board, by taking UDP and AAL2 as examples.

A general process for converting from IP to ATM is that, the IP data package reaches an Ethernet port of the ATM interface module, and after being processed by ARP and UDP/IP protocol stacks, is received by an application task of the module; the application task parses the route index of AAL2 from the header of the data package, searches the routing table, obtain a complete AAL2 parameter and notifies AAL2 processing task of processing the data package; AAL2 processing task executes its protocol function and notifies the ATM layer; the ATM layer executes its protocol function and transmits it out.

A general process for converting from ATM to IP is that, the ATM information cell reaches the ATM port of the ATM interface module, and after being processed by the ATM layer, is received by the AAL2 processing task of the module; AAL2 processing task executes its protocol function, recombines a complete data package, and notifies the application task; the application task searches the routing table according to the obtained AAL2 index to obtain a complete processed index of the upper application protocol; the application task encapsulates the upper layer application data package, submit it to the UDP/IP layer to perform the protocol stack processing and transmit it out from Ethernet port.

The routing table in the above converting processes is established and maintained by the application task of the ATM interface module under the control of the interface control module.

With reference to FIG. 7, ETH, ARP, TCP/UDP/IP are achieved by hardware, Socket, API, APP and IP/ATM Routing, ATM API, ATM ARP are achieved by software, and AAL5, AAL2, ATM are achieved by hardware.

The invention claimed is:

1. A radio network controller comprising:
a plurality of functional modules, including an Asynchronous Transfer Mode (ATM) interface module having at least an Iu interface module configured to provide a connection with an external core network, an Iub interface module configured to provide a connection with an external node B element, and an Iur interface module configured to provide a connection with a second radio network controller, each respective interface module being configured to convert a received ATM cell to an Internet Protocol (IP) packet;
an interface management module having at least an Iu management module, an Iub management module, and an Iur management module, each respective management module being configured to manage connections of each of the respective interface modules;
a radio signaling management module configured to manage broadcast signaling data received by the ATM interface module;
a radio bearer processing module configured to process data received by the ATM interface module over a dedicated transmission channel; and
an IP switching network to achieve data and signaling exchange among the functional modules.

2. The radio network controller according to claim 1, wherein the IP switching network supports QoS.

3. The radio network controller according to claim 1, wherein each of the functional modules respectively includes at least one functional board, and the functions of each of the functional modules are respectively achieved in different functional boards.

4. The radio network controller according to claim 1, wherein each of the functional modules are arranged in a single chassis to form a elementary unit of the radio network controller.

5. The radio network controller according to claim 4, wherein the IP switching network includes an IP switching module disposed in the chassis, and each of the functional modules are configured to achieve the data and signaling by connecting with the IP switching module.

6. The radio network controller according to claim 5, wherein the ATM interface module and the radio bearer processing module are disposed in at least one extended unit, such that the radio network controller includes the at least one extended unit of the radio network controller.

7. The radio network controller according to claim 6, wherein the IP switching network comprises a group of IP switching modules and concentrator routing switches, wherein the IP switching module connects each of the functional modules in the elementary unit and extended unit of the radio network controller, and at least one of the concentrator routing switches connects the respective units via the IP switching module.

8. The radio network controller according to claim 6, wherein a number of respective interface ATM boards constituting the ATM interface module is configured according to the data flow of the respective interface modules and a number of ports required to be provided, and a number of radio bearer processing boards constituting the radio bearer processing module is configured according to a number of the users to be supported and the data flow.

9. The radio network controller according to claim 4, wherein each of the functional modules include an information filling module configured to fill in a Differential Services (DiffServ) field of an IP header to be transmitted.

10. The radio network controller according to claim 7, wherein at least one of the IP switching module and the concentrator routing switch is configured to read a DiffServ field of an IP header of a data package.

11. The radio network controller according to claim 1, wherein an interface ATM board constituting the ATM interface module is configured to achieve ATM/IP conversion, so as to provide an ATM interface between the radio network controller and an external network element.

12. The radio network controller according to claim 6, wherein each of the functional modules includes an information filling module configured to fill in a DiffServ field of an IP header to be transmitted.

13. The radio network controller according to claim 7, wherein at least one of the IP switching module and the concentrator routing switch is configured to read a DiffServ field of an IP header of a data package.

* * * * *